June 10, 1958  L. R. HAVERBERG  2,837,759
WHEEL WASHER

Filed Aug. 23, 1956 2 Sheets-Sheet 1

INVENTOR.
Loren R. Haverberg

Barnes & Seed
Attorneys

June 10, 1958     L. R. HAVERBERG     2,837,759
WHEEL WASHER
Filed Aug. 23, 1956     2 Sheets-Sheet 2
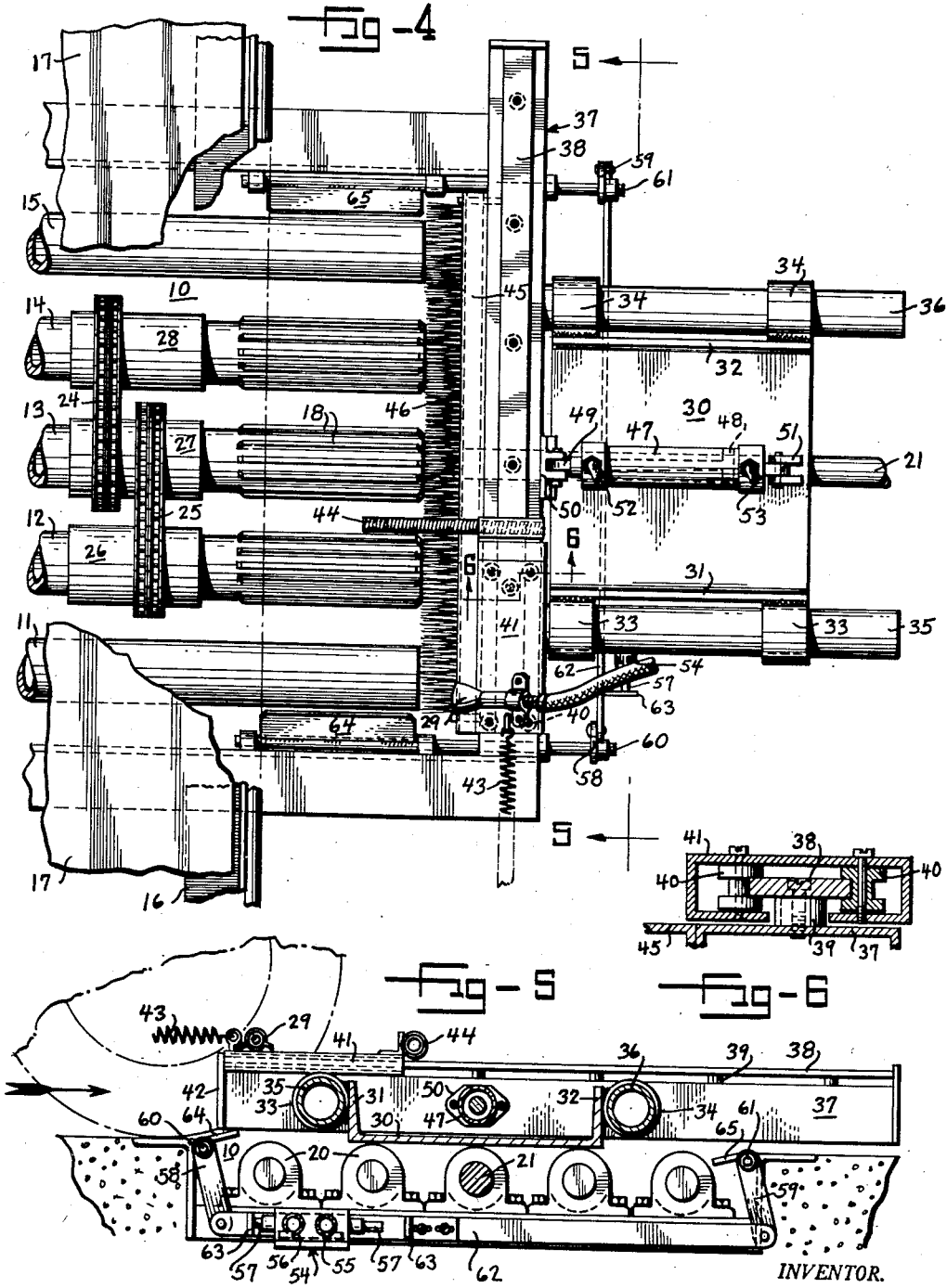
INVENTOR.
Loren R. Haverberg
BY *Barnes & Seed*
Attorneys United States Patent Office 2,837,759
Patented June 10, 1958

2,837,759

WHEEL WASHER

Loren Russell Haverberg, Chicago, Ill.

Application August 23, 1956, Serial No. 605,734

2 Claims. (Cl. 15—302)

The present invention relates generally to wheel washers, and more specifically to equipment for serving as a wheel or tire washing station in car washes of the general type in which the vehicle being washed is moved through successive washing stages.

It has been found that the rotating brushes or other equipment normally used in commercial car washes to clean the wheels is not always effective, particularly in cleaning white sidewall tires. This latter difficulty has been prevalent in the so-called automatic car washes in which the automobile is continuously drawn through the washing stations.

Accordingly, this invention aims to provide an improved wheel washer which will effectively wash white sidewalls while the same are being moved continuously therethrough.

The invention further aims to provide such a washer which will occupy a relatively short distance along the travel path of the vehicle being washed.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Fig. 4 is an enlarged fragmentary plan view of the right side of the washer and with certain parts broken away.

Fig. 5 is a vertical sectional view taken on line 5—5 of Fig. 4.

Fig. 6 is an enlarged fragmentary transverse sectional view taken on line 6—6 of Fig. 4.

Figure 1:
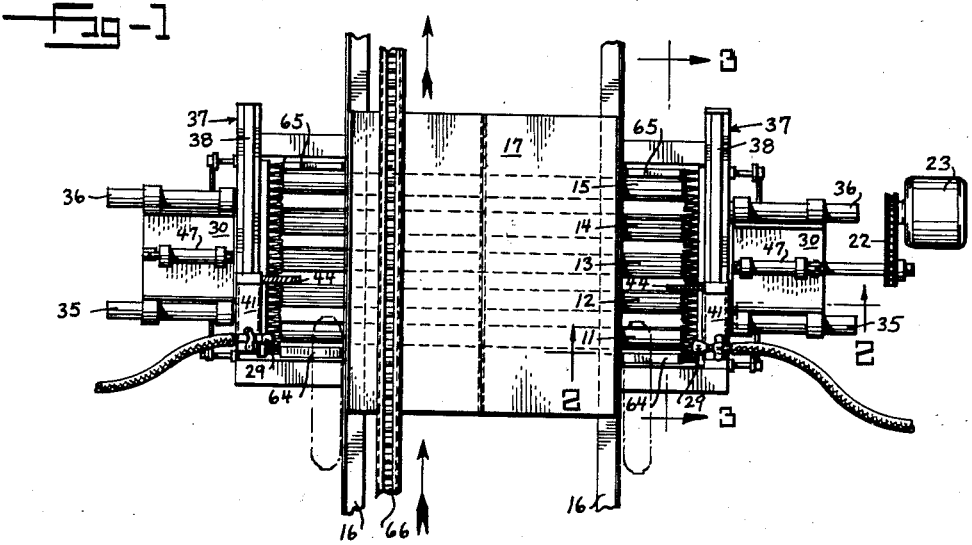
Figure 1 is a top plan view of my invention.
Figure 2:
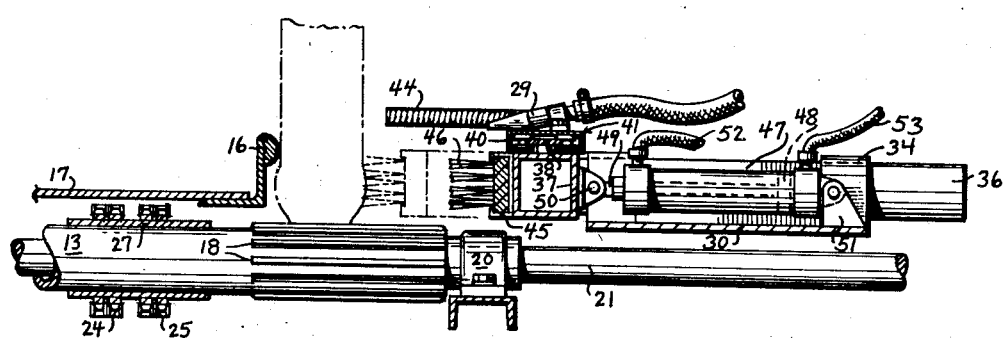
Fig. 2 is a fragmentary transverse vertical sectional view taken on line 2—2 of Fig. 1.
Figure 3:
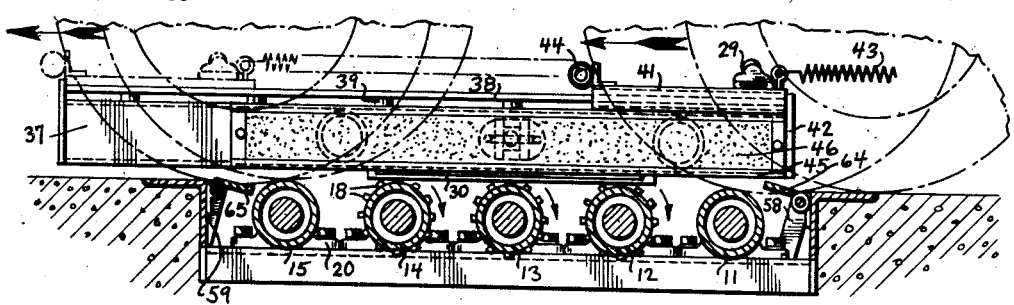
Fig. 3 is a longitudinal vertical sectional view taken on line 3—3 of Fig. 1.

Referring to Fig. 1, it is seen that a pair of identical wheel washing assemblies are provided at opposite sides of the path to be taken by the vehicle to be washed and hence, the same identifying numerals have been applied to corresponding parts of each assembly. Between these assemblies is located a well 10 which houses a gang of transversely extending hollow rollers 11-15, shown as being five in number for purpose of example only. The well is bridged by a pair of guide rails 16—16 carrying a cover plate 17 and so spaced as to leave opposite end portions of the rollers exposed to be engaged by the vehicle tires. These exposed end portions of the center three rollers 12-14 have traction flutes 18. At their extreme ends the rollers are necked and journaled in respective bearings 20.

The outer rollers 11, 15 are idlers while the other rollers 12—14 are power driven. For this purpose the middle roller 13 has a central shaft 21 which is secured to the necked ends thereof and extends by its right end to receive a chain and sprocket drive 22 from a motor 23. Power is in turn transferred fore and aft to rollers 12, 14 by chains 24, 25 working on respective sprockets which are mounted on sleeves 26—28.

Overlying the right-end extension of shaft 21 is an anchored bed plate 30. This plate has upstanding front and rear flanges 31, 32 to the outside faces of which are welded respective pairs 33—33 and 34—34 of slide journals. These journals receive tubular arms 35, 36 which are rigidly secured at their inner ends to an elongated hollow member 37 of square cross-section and parallelling the guide rails 16—16. A flat track 38 is mounted above member 37 by spacers 39 located along its longitudinal center line. Riding on the side edges of track 38 are two pairs of vertical concave rollers 40 which support a carriage 41 for a steam nozzle 29. The carriage 41 is yieldingly urged rearwardly against a stop plate 42 by a spring 43 which is connected at its forward end to the rear end of the carriage and has its other end anchored. At its forward end the carriage has an inwardly projecting arm 44 which may consist of a length of a stiff coil spring so as to be slightly flexible in the fore and aft direction.

A brush holder 45 is mounted along the inner side of member 37 and retains the back of a group of alined brushes 46 having their bristles directed inwardly. Oppositely from these brushes and between the arms 35, 36 there extends a double acting hydraulic cylinder 47 whose piston is denoted 48. This cylinder has its piston rod 49 pinned between ears provided by an attachment 50 to member 37 and has its outer end anchored to the bed plate as by pinning to lugs 51. Fluid lines 52, 53 lead to the ends of this cylinder. Line 52 is constantly a pressure supply line to the small area of the piston 48 whereas line 53 functions selectively as a supply and dump line to the large area of the piston.

Flow through line 53 is controlled by a shuttle valve 54 which is fed through a side supply port 55 toward the forward end of the valve from the same source of fluid under pressure as for line 52. Line 53 is connected to a center port (not shown) at the inner side of the valve and a dump line is connected to a side port 56 toward the rear end of the valve so that when the shutle, whose through-stem is designated 57, is in the Fig. 5 position, line 53 communicates with the dump port 56. Accordingly, when the shuttle shifts from this dumping position to the left or rear as viewed in Fig. 5, line 53 is brought into communication with supply port 55 and hence the shuttle assumes a fill position.

Operation of the shuttle valve is accomplished via a parallel linkage which includes a pair of depending cranks 58, 59. These are mounted at their upper ends on transversely exetnding rods 60, 61 journaled at the ends of the well 10 and have their lower ends pivotally connected to the opposite ends of a horizontal two-piece link 62. This link in turn has a pair of spaced lugs 63 arranged to alternately engage the ends of the valve stem 57 such that the valve shuttles in concert with endwise shifting of the link. Turning of the cranks 58, 59 to shift the link is the function of a pair of trip levers or plates 64, 65 carried by rods 60, 61 such as to be in alined parallel relation with the exposed end portions of the roller 11—15. When the cranks 58, 59 are in a vertical position the trip levers 64, 65 extend horizontally toward one another so that when one is tilted upwardly the other is depressed a corresponding amount. Accordingly, when lever 64 is tilted upwardly as in Fig. 5 the shuttle valve 54 is in its dumping position; similarly, when lever 64 is depressed and lever 65 is elevated, the shuttle valve is in its fill position causing piston 49 to urge the brushes inwardly over the rollers 11—15. It will be noted that the rollers 11, 15 are spaced sufficiently from the rods 60, 61 to assure that a wheel passing over the trip levers will consecutively depress them the proper amount. In this regard the distance between the trip levers 64, 65 should be less than the wheel base of the automobiles to be washed so that the front and rear wheels will not be in the wheel wash at the same time.

Reviewing the operation of my wheel washer, when prepared for the front wheels of an approaching car, the trip levers 64 are elevated, the brushes 46 are retracted, the nozzle carriages 41 bear against their stop plates 42, and rollers 12—14 are being powered by the motor 23. The vehicle is dragged along as by a drag chain 66 and is kept in the proper path by the rails 16. When the front wheels depress levers 64 and move into roller 11 the shuttle valve is shifted from its dumping position to its fill position thereby causing members 37 with their brushes to move inwardly into engagement with the front wheels due to the fluid pressure acting against the larger area of piston 48. This inward movement of members 37 also brings arms 44 into the path of the wheels so that as the latter move onto roller 12 they engage the arms. Accordingly, through the remainder of their travel over the rollers, the wheels, by pushing arms 44, cause the carriage 41 to move along in concert therewith so that the nozzle 29 will maintain a constant relationship with the wheels. The purpose of the powering of rollers 12—14 is to develop a greater wheel speed than that which would result from the forward travel of the vehicle as it is pulled by the drag chain 66. The position of the nozzle with respect to the brushes 46 is such that the nozzle sprays a cleaning agent into the sidewall of the rotating tire directly in advance of the contact of the sprayed sidewall surface with the bristles of the brushes. This action is in accordance with the teachings of my prior United States Patent No. 2,718,650, issued September 27, 1955. The cleaning agent can be steam alone, steam mixed with a suitable soap or detergent, a liquid detergent, etc. When the wheels reach and depress levers 65 the valves 54 are moved to their dump position and levers 64 are raised in preparation for the rear wheels of the vehicle. The moving of the valves to their dump position causes the pistons 48 of the hydraulic cylinders 47 to be urged outwardly thereby retracting members 37 and their brushes 46. This retraction of members 37 also causes the arms 44 to be retracted from in front of the wheels so that the springs 43 can return the carriages 41 to the rear end of the tracks 38 into engagement with the stop plates 42. The washer is then ready for the rear wheels.

It is thought that the invention will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest intepretation to which the employed language admits.

What I claim:

1. In a wheel washing machine, means for moving a wheel to be washed forwardly along a given travel path, means for rotating said wheel in the forward direction of rotation considerably faster, rim speed considered, than the bodily speed of the wheel while being moved along said travel path, an elongated brush assembly paralleling said travel path, means responsive to the travel of a wheel along said travel path for selectively moving said brush assembly at cross-angles to said travel path into and out of wheel engaging position when said wheel is near the beginning and end, respectively, of said brush assembly, a track mounted on the brush assembly and extending therealong in parallel relation to said travel path, a carriage on said track for movement therealong, an arm carried by said carriage and arranged to extend into said travel path to be engaged by the front of the wheel being washed when the brush assembly is in wheel engaging position to thereby move the carriage along the track in concert with the wheel and be retracted from said travel path when the brush assembly is withdrawn from wheel engaging position, carriage return means operatively associated with said carriage for yieldingly resisting movement of said carriage along the track in response to travel of said arm along said travel path with said wheel being washed and thereby operative to return said carriage when said arm is retracted from said travel path, and a nozzle above said brush carried by said carriage rearwardly of said arm and directed toward said travel path such as to direct a cleaning agent supplied to the nozzle against the forward portion of the wheel whereby the cleaning agent will be disbursed over the approaching rotating wheel surface to be washed just before contact therewith by the bristles of said brush assembly.

2. In a wheel washing machine, means for moving a wheel to be washed forwardly along a given travel path, means for rotating said wheel in the forward direction of rotation considerably faster, rim speed considered, than the bodily speed of the wheel while being moved along said travel path, an elongated brush assembly, paralleling said travel path, anchored double-acting hydraulic cylinder means operatively connected to said brush assembly for moving the same in a straight line at cross-angles to said travel path, control means responsive to the travel of a wheel along said travel path for selectively activating said hydraulic cylinder means such as to cause the same to move said brush assembly into and out of wheel engaging position when said wheel is near the beginning and end, respectively, of said brush assembly, a track carried by the brush assembly and extending therealong in parallel relation to said travel path, a carriage mounted on said track for movement therealong, an arm carried by said carriage and arranged to extend into said travel path to be engaged by the front of the wheel being washed when the brush assembly is in wheel engaging position to thereby move the carriage along the track in concert with the wheel and be retracted from said travel path when the brush assembly is withdrawn from wheel engaging position, carriage return means operatively associated with said carriage for returning said carriage when said arm is retracted from said travel path, and a nozzle above said brush carried by said carriage rearwardly of said arm and directed toward said travel path such as to direct a cleaning agent supplied to the nozzle against the forward portion of the wheeel whereby the cleaning agent will be disbursed over the approaching rotating wheel surface to be washed just before contact therewith by the bristles of said brush assembly.

References Cited in the file of this patent

UNITED STATES PATENTS

| 1,360,304 | McGauley | Nov. 30, 1920 |
| 1,884,878 | Samuels | Oct. 25, 1932 |
| 1,909,869 | Randrup | May 16, 1933 |
| 2,242,692 | Yingling | May 20, 1941 |
| 2,671,913 | Kirsch | Mar. 16, 1954 |
| 2,692,214 | Hurst | Oct. 19, 1954 |
| 2,716,772 | Cockrell | Sept. 6, 1955 |
| 2,718,650 | Haverberg | Sept. 27, 1955 |
| 2,761,170 | Bonneau | Sept. 4, 1956 |